Patented Mar. 14, 1933

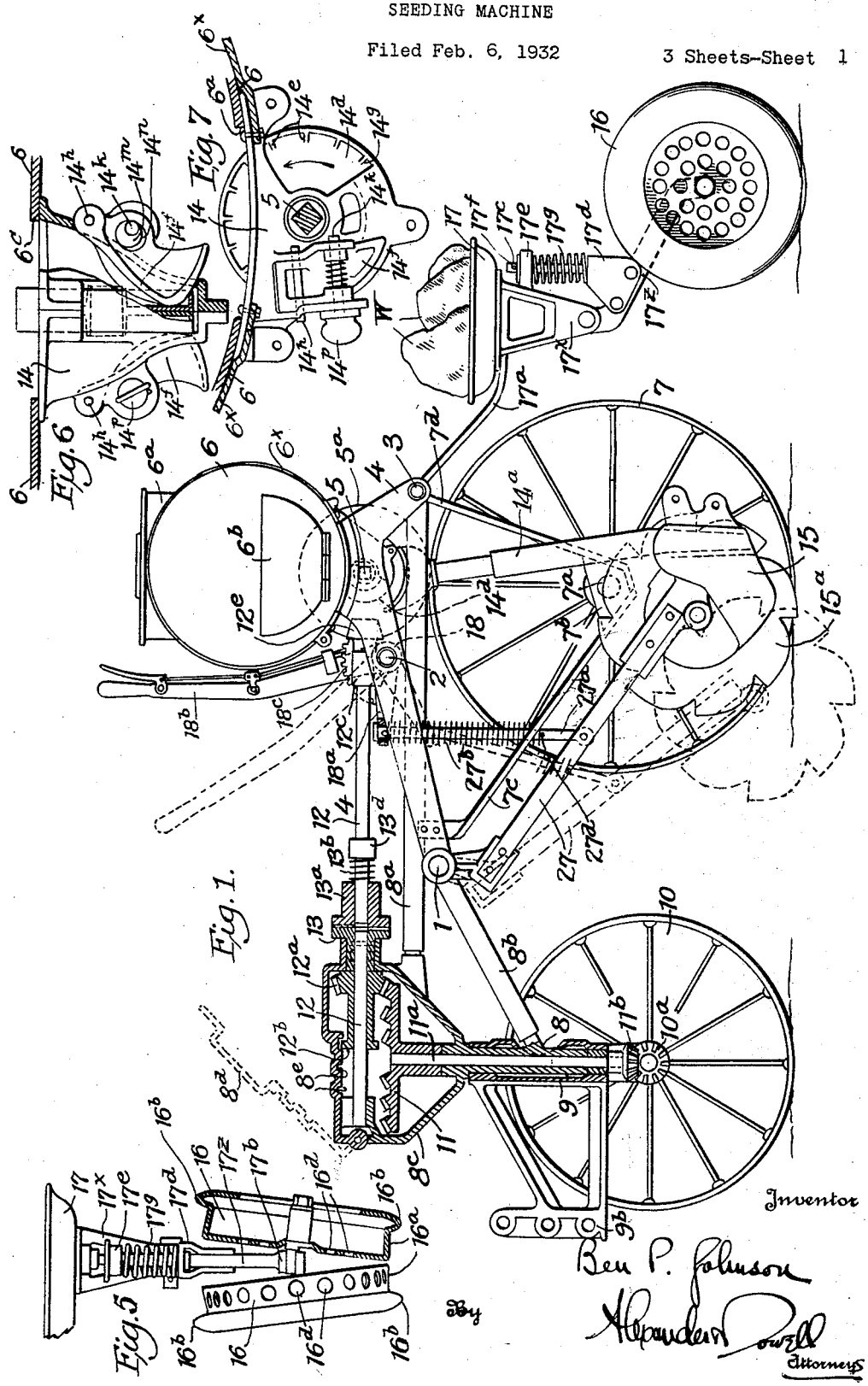

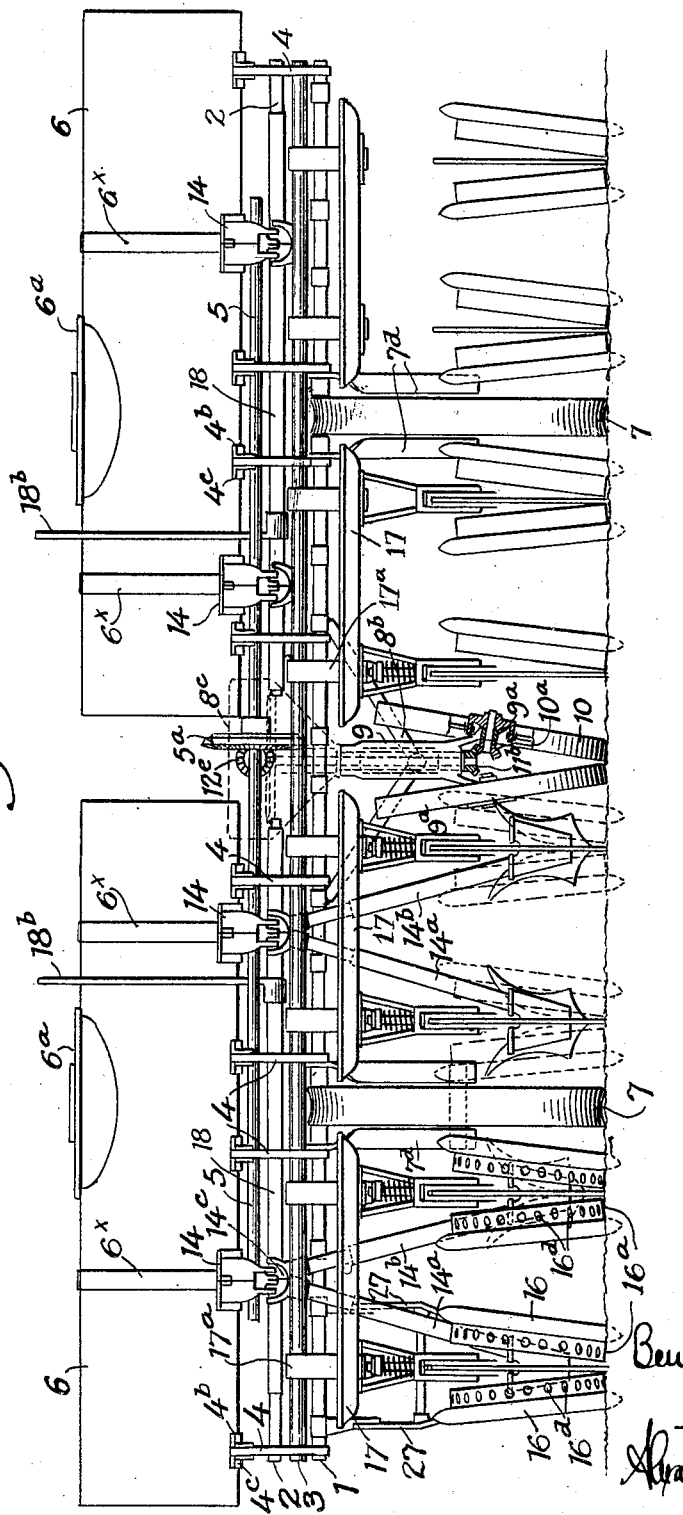

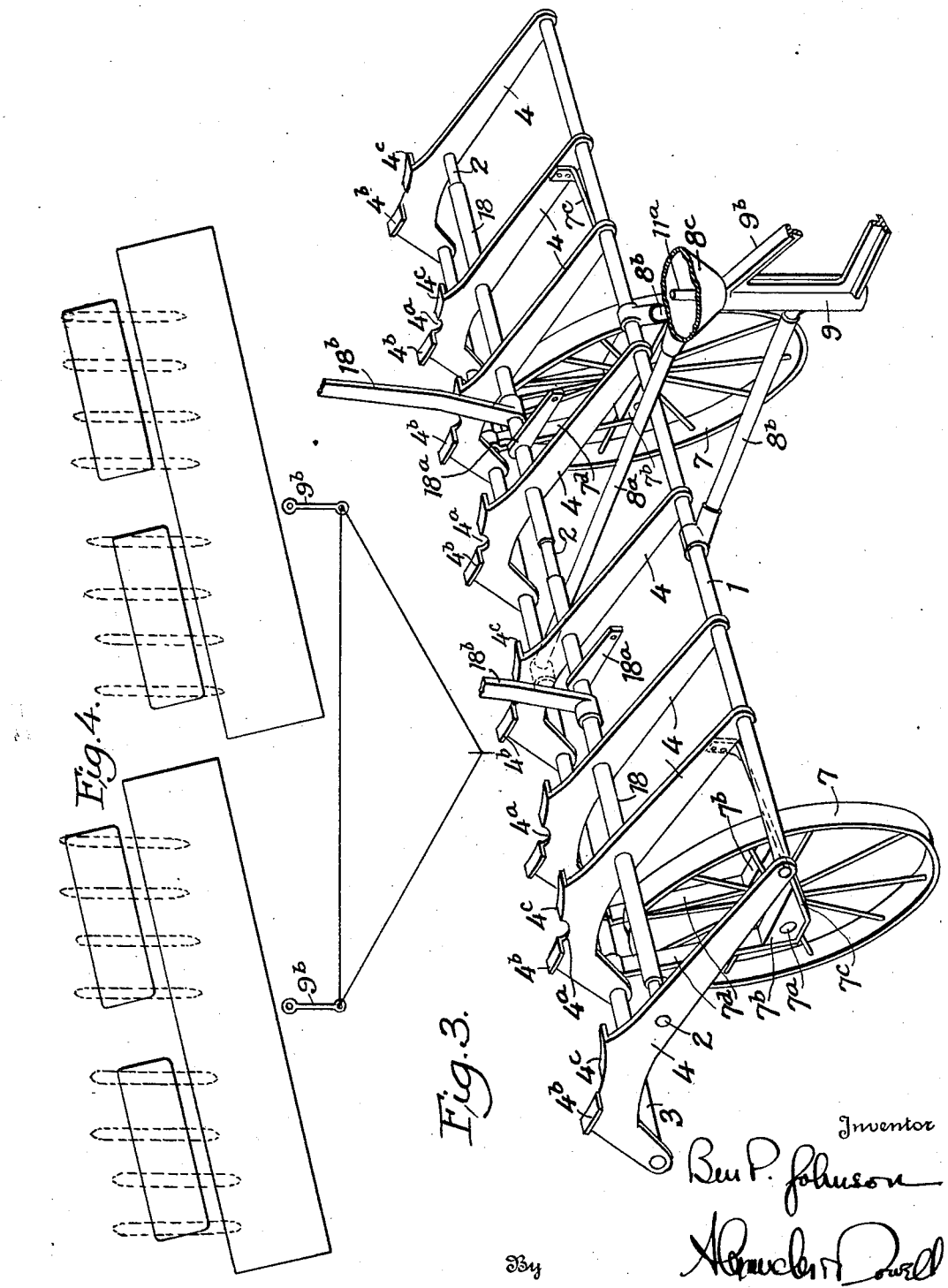

1,901,298

UNITED STATES PATENT OFFICE

BEN P. JOHNSON, OF SPRINGFIELD, OHIO, ASSIGNOR TO EDWARD E. GREINER, OF SPRINGFIELD, OHIO

SEEDING MACHINE

Application filed February 6, 1932. Serial No. 591,407.

This invention is a novel improvement in seeding machines, and the principal object of the invention is to provide a seeding machine of simple construction and efficient operation, particularly adapted for use as a "deep-furrow" seeding machine, which will produce a greater yield.

In the large wheat producing areas west of the Mississippi River, wide machines have been in popular demand adapted to sow grain or the like in rows six, seven, and eight inches apart, one and one-half to two inches deep in narrow seed trenches, but Government experiments have demonstrated that a greater yield can be produced by sowing the seeds in rows twelve to fourteen inches apart and four or five inches deep, in seed trenches three to four inches wide, this method being known as the "deep-furrow" method. My machine is adapted for use in sowing by this "deep-furrow" method, the construction being very much simpler than machines for sowing by the old method, there being but only about half the number of feeds or distributors for the grain, and the quantity of grain being regulated by the speed of the feed wheels in the distributors.

A further object of the invention is to provide a deep furrow seeding machine comprising a frame supported by two small wheels inset from the ends of the frame which wheels being placed nearer the center of the machine will eliminate center sagging and will require less material in the wheels than the usual end wheel constructon; also a frame supported at the front of the machine by two closely adjacent wheels on the combined steering and balancing forecarriage, one wheel of which transmits power through suitable gearing to an upright shaft located in the head of the forecarriage, then through a sliding pinion to the driving gear shaft operating the distributors disposed below the grain hoppers.

Another object of the invention is to provide a deep furrow seeding machine equipped with a furrow opener having a cut-away coulter lister hoe, also adjustable press and mulching wheels disposed in rear of the furrow openers and operating in the seeded furrows.

Other minor objects of the invention will be hereinafter set forth.

I will explain the invention with reference to the accompanying drawings which illustrate one practical embodiment thereof to enable others familiar with the art to adopt and use the same; and will summarize in the claims the novel features of construction, and novel combinations of parts, for which protection is desired.

In said drawings:

Fig. 1 is a side elevation of the seeding machine with the forecarriage partly broken away;

Fig. 2 is a rear end elevation thereof;

Fig. 3 is a perspective view showing the frame construction of the machine;

Fig. 4 is a top plan view of the machine showing the angularity of the frames relative to the direction of pull;

Fig. 5 is an end view of the mulching wheel set;

Fig. 6 is an enlarged rear elevation of the seed distributors;

Fig. 7 is an enlarged side elevation thereof.

My novel seeding machine preferably comprises a frame shown in perspective in Fig. 3, consisting of three parallel bars of tubular steel, namely, a front bar 1, center bar 2, and rear bar 3, the center bar 2 being the bedrail, and all bars running the full length of the frame. These bars are held together by cross-plates 4 of obtuse angularity, the cross-plates being welded to both front and rear bars 1 and 3. The center bar 2 is welded only to the two end plates 4 as it carries tubular sleeves 18 at each side of the center line of the frame, which sleeves together extend substantially the full width of the frame, and as they carry the lifter arms 18a for the furrow openers, the sleeves 18 must be free to rotate upon bar 2, for the purpose hereinafter described. In the construction shown there are eight cross-bars 4. At the apex of each cross-bar 4 (except the end bars) is a recess 4a forming a bearing for the reception of the feed shaft 5 which actuates the distributors 14 hereinafter referred to, and at each side of the recess 4a in the cross-bars 4 are oppositely disposed flanges 4b and 4c upon which the seed hoppers 6 rest, said hoppers overlying the feed shaft 5.

The rear ground wheels 7 are preferably mounted on axles 7a extending through blocks 7b at opposite sides of the wheel hub, which blocks are underslung under the frame by means of straps 7c and 7d respectively connecting the blocks with the front and rear frame bars 1 and 3, whereby the ground wheels are inset from the ends of the frame in order to obviate sagging of the frame and to save material, as by such construction the wheels 7 may be made of minimum diameter with respect to the height of the frame from the ground.

The frame is provided with a forecarriage consisting of a bearing casting 8 rigidly mounted on the center line of the frame connected by struts 8b, 8a, respectively, to the front and rear frame bars 1 and 3, the two struts 8b being angularly disposed with respect to each other and fixedly positioning the forecarriage with respect to the frame. The casting 8 preferably comprises a tubular shank having an enlarged hollow head 8c on its upper end. Around the tubular shank or lower portion of the forecarriage casting 8 is a steering casting 9 rotatably mounted on the casting 8, said steering casting 9 being bifurcated at its lower end, as shown in Fig. 2, the outer ends of the bifurcations 9a containing journals for the front wheels 10 which are preferably toed in at their bottoms, as shown in Fig. 2, so that their peripheries are closely adjacent at the ground level. In the housing 8a at the upper end of the bearing casting 8 is a change speed gear 11, the gear being mounted on a vertically disposed shaft 11a journaled in bearings extending downwardly through the hollow shank of the casting 8. The shaft 11a has on its lower end a small bevel gear 11b meshing with a bevel gear 10a on the hub of one of the front wheels 10, whereby as the forecarriage and machine is moved along the ground the said wheel 10 will rotate the shaft 11a and the change speed gear 11. Hence the right hand wheel 10 (Fig. 2) on the forecarriage is the drive wheel transmitting power through the bevel gear 10a on its axle to the bevel gear 11b on the vertical shaft 11a which rotates the change speed gear 11 located in head 8a of forecarriage 8. Gear 11 rotates sliding pinion 12a splined on shaft 12, and a bevel gear 12e on shaft 12 meshes with driving gear 5a on the distributor operating shaft 5 below grain hoppers 6. Gears 11 and 12a are housed in the head 8c protecting same from excessive wear caused by dirt or dust.

The forward wheels 10 are steered by means of a bracket 9b connected with the rotatable steering casting 9, said bracket extending beyond and in front of the front wheels 10 and adapted to be connected with a suitable tractor hitch, or a tongue casting for a horse hitch. Hence my forecarriage embodies a combination steering and driving device and maintains the balance of the machine frame.

The change speed gear 11 is provided with three concentric rows of teeth representing the three speeds, fast, intermediate, and slow. Power to drive the feed shaft 5 located below the hoppers 6 is obtained by engaging any row of teeth on the gear 11 with sliding pinion 12a. The pinion 12a is held in mesh with the teeth on gear 11 by engagement of a flange 12b on its hub with one of the notches 8e in the bottom of the hinged lid 8d of head 8c. When the lid 8d is closed, the pinion 12a is locked in place with respect to shaft 12. To change the speed, raise the lid 8d of the housing 8c, and slide the pinion 12a into mesh with any row of teeth on gear 11 and then close the lid.

One end of the shaft 12 is journaled in the head 8c above gear 11, the other end being journaled in a bearing 12c mounted on the center frame bar 2, said shaft 12 being disposed on the center line of the machine.

In order to break the drive to avoid breakage of the parts in event foreign substances should become clogged in any of the distributors, and in event the direction of the machine is reversed, I provide a ratchet mechanism to overcome breaking of gears and twisting of drive shaft, said mechanism also acting as a warning to signal the operator that something has caused the machine to become inoperative. This mechanism is as follows:

Shaft 12 is made in two sections and two ratchet faced clutch members 13 and 13a are mounted on the ends of the shaft sections, one member (13a) being slidably splined on its section and normally held in engagement with the other member 13 by a spring 13b interposed between the member 13a and a collar 13d fixed on its shaft section, the spring being sufficiently strong to normally cause both shaft sections 12 to rotate as a unit; but in case the distributors should become clogged to prevent rotation of drive shaft 5, or in event the direction of movement of the machine is reversed, the spring 13b will permit the teeth of ratchets 13—13a to overrun, thereby preventing breakage of the parts.

The two grain hoppers 6 are disposed at opposite sides of the center line of the frame and rest in the saddle 4b, 4c, of the frame cross-arms 4, and are held down upon the saddles by means of straps 6x as shown in Figs. 1 and 7, the ends of the straps being removably connected to the distributors. It has heretofore been the practice in designing all metal hoppers to imitate in shape and length those constructed of wood, thereby requiring a heavy gauge metal. By constructing each hopper 6 in shorter length and using two hoppers in place of one long hopper, I obtain the desired strength with decreased cost. In the design of the lids 6a, I have adopted short openings in the units, thereby retaining strength, which would not be the case if the lids 6a ran the full length of each unit 6. In the outer ends of each unit, I have placed a removable plate 6b (Fig. 1) to furnish a quick and easy means for cleaning each hopper.

Below each of the hoppers 6 and adjacent the ends thereof are two double run force feed distributors 14, which may be of the type disclosed in my copending applications Serial No. 591,409, filed Feb. 6, 1932; and Serial No. 591,727, filed Feb. 8, 1932. Each distributor 14 comprises a casting secured to the bottom of the hopper 6, and opening 6a (Fig. 6) being provided in the hopper above the casting. A feed wheel 14d is journaled in the casting 14 through which wheel the drive shaft 5 extends as indicated in Fig. 7. Wheel 14d is double acting and is provided with teeth 14e on each side adjacent the periphery to simultaneously feed seeds on both sides of the wheel as the same rotates in the direction of the arrow in Fig. 7, the seeds dropping down into casting 14 from hopper 6 on both sides of the wheel and passing the adjustable throats 14f and discharging at points 14g (Fig. 7) into the divided throat 14c of the distributors 14a and 14b. Hence each distributor 14 (Figs. 6 and 7) feeds seeds behind two furrow openings by means of tube 14a, 14b (Fig. 2) extending from a throat 14c disposed below each of the distributors. Each distributor is operated by the drive shaft 5 and feeds seeds independently to its respective feed tubes 14a and 14b and hence only half the usual number of distributors are utilized in my machine, as each distributor feeds seeds behind two furrow openers.

My double run distributors have large openings on both sides of the feed wheel 14d (Fig. 6) and have means to regulate the amount of seed distributed by opening and closing the adjustable throats 14f and by changing the speed of the feed wheel.

As shown, each throat 14f is hinged as at 14h to the sides of the casting 14 and is adapted to be swung towards or away from the web of wheel 14d adjacent its periphery to regulate the amount of seed delivered at the discharge point 14g. In order to adjust the throat 14f I provide a shaft 14k carrying eccentric cams 14m operating in loops 14n on the back of the throats 14f, whereby as the shaft 14k is rotated by knob 14p the throat will be pivoted.

The spaced furrow openers preferably comprise a pair of mold boards 15 disposed at opposite sides of a rolling coulter hoe 15a preferably of the type shown in my copending application, Serial No. 428,892, filed Feb. 17, 1930, and therefore needs no particular description herein. Each furrow opener is preferably carried by an A-frame 27 pivotally mounted upon the front frame bar 1 as shown in Fig. 1, whereby the furrow opener may be raised or lowered as hereinafter described. Each frame 27 is provided with a pressure rod 27a (Fig. 1) pivotally connected to an arm 18a on the tubular sleeve 18 which is rotatably mounted upon the center frame bar 2, the sleeve 18 having a lever 18b and ratchet mechanism 18c whereby the handle 18b may be set at any angularity desired. The pressure rod 27a preferably passes through a bore in the outer end of the arm 18a and a head on the upper end of rod 27a prevents the arm 18a from becoming disengaged from the rod. The arm 18a is adapted to slidably engage the rod 27a and a spring 27b is interposed between the arm 18a and an adjustable pin 27d on the lower end of the pressure rod whereby the tension of the spring 27d may be changed. By the above construction when the arm 18a is depressed, the rod 27a will be yieldably depressed to hold the furrow openers 15 down to their work to open a furrow in front of the feed tubes 14a, 14b. When however the arm 18a is raised, as in full lines Fig. 1, the arms 18a will engage the head on the upper end of the rod 27a and positively raise the furrow openers 15 into inoperative position above the ground level as shown in full lines in Fig. 1.

Connected with the rear of the machine behind each furrow opener 15 and operating in its respective furrow, is a set of mulching wheels 16 for the purpose of conserving moisture over the seed. As shown in Figs. 1 and 2, each set is secured to a pan 17 hingedly connected by straps 17a to the rear frame bar 3, and each pan 17 is adapted to hold weights W whereby the mulching wheels 16 may be held down to their work with varying pressures. On the underside of each pan 17 are two brackets 17x (one for each set of wheels 16) and pivoted to each bracket 17x is an arm 17z which carries the hub-holding head 17b for the set of mulch wheels 16. For yieldably depressing the arms 17z, I provide a bolt 17c on a bracket 17d on the arm 17z passing upwardly through a bracket 17e on casting 17, said bolt 17c being provided with a cotter pin 17f above bracket 17e to limit the downward swing of the arms 17z. Around bolt 17c between the brackets 17e and 17d is a spring 17g yieldably depressing the arm 17z to hold the wheels 16 down on the ground.

Each arm 17z carries a pair of wheels 16 which are set at an angle to each other as shown in Fig. 5, the same being toed in at the bottom and each wheel has a flat pressing surface 16a extending about two-thirds of the width of the wheel, the remaining one-third being an annular flange 16b of half round cross-section. When pressure is applied, the projections 16b will form trenches at the outer edges of seed furrow, where no seed has been deposited. The companion wheel being the same, when the two meet at the bottom of the furrow the soil is pressed by the portions 16a down over the seed. The press or mulch wheels 16 are preferably of the type disclosed in my copending application Serial No. 591,408, filed Feb. 6, 1932.

The half round projection 16b forms trenches at the sides of the furrow to retain the loose soil that falls in from the sides of the furrow, thereby preventing too much soil from falling upon seed as disclosed in my aforesaid application. Both wheels 16 are adjustable and by means of their adjustment, they can be spread apart at the rear and when so adjusted, the outer flange picks up the loose fine soil from the sides of the trench. When the wheels 16 are in motion, this loose soil is rolled to the center of wheel and is discharged through holes 16d in the flange 16a and inner wall of the wheel, the soil falling as a dry mulch upon the soil that has been pressed over the seed. The object of the loose soil mulch is to retain the moisture in the pressed soil over the seed. Other forms of mulch wheels may be used if desired.

As shown in Fig. 4 the frame of each seeding machine, when used side by side may be set at angle of about 14 degrees relative to direction of pull. My reason for adopting the angle is to allow an overlap to each furrow opener, allowing them to pass over or cut through trash and surface litter without clogging or shouldering. This prevents pulverizing the soil for if they were in a straight rank, the soil thrown by one furrow opener clashes with the soil thrown by the one next to it, breaking same into fine particles, which are easily shifted by high winds. When overlapped, this action does not take place and the soil is left in a lumpy state, preventing shifting by high winds.

When two or more seeding machines are hitched together, this construction simplifies a hitch for a gang drill hook-up. It also avoids ends of machines interfering when making turns My seeding machine may be utilized in connection with a rotary hoe attachment as disclosed in my copending application Serial No. 592,638, filed Feb. 12, 1932; and with a combination grain and fertilizer distributors to distribute grain and fertilizer in granular or pellet form, in regulated quantities as disclosed in my copending application Serial No. 591,727, filed Feb. 8, 1932.

I claim:—

1. In a seeding machine, a frame; a supporting wheel adjacent each end of the frame; a combined steering and balancing wheeled forecarriage connected to the frame on the center line thereof; a series of furrow openers vertically adjustably mounted with respect to the frame; seed distributors, a cylindrical seed hopper on each side of the center line of the frame; means connected with the distributors for holding the hoppers on the frame; distributing pipes extending from the distributors and discharging behind the respective furrow openers; a drive shaft for operating the distributors; and means operated by the forecarriage for rotating the shaft.

2. In a seeding machine, a wheeled frame, a combined steering and balancing wheeled forecarriage connected to the frame; a series of furrow openers on the frame; hoppers, seed distributors cooperating with the hoppers to feed seed behind the furrow openers; a drive shaft for operating the distributors, a vertical shaft in the forecarriage; means for rotating the shaft by and with the forecarriage wheels; a horizontal shaft above the vertical shaft; gearing connecting the horizontal shaft and drive shaft; and change speed gearing connecting the vertical shaft and horizontal shaft.

3. In a seeding machine, a frame comprising parallel bars extending the width of the machine; spaced cross-arms connecting the frame; a supporting wheel adjacent each end of the frame; a combined steering and balancing forecarriage on the centerline of the frame; struts fixedly connecting the forecarriage with the frame bars; a seed hopper mounted on the cross-arms; a series of furrow openers vertically adjustably mounted with respect to the frame; seed distributors mounted opposite openings in the hopper; distributing pipes extending from the distributors and discharging behind the respective furrow openers; a drive shaft for operating the distributors; and means operated by the forecarriage for rotating the shaft.

4. In a seeding machine as set forth in claim 3, said cross-arms each having an obtuse angularity in the vertical plane with the apex uppermost; a saddle formed in the top of each cross-bar for receiving the hopper; and a bearing in each cross-bar below the saddle for the drive shaft.

5. In a seeding machine as set forth in claim 3, said forecarriage comprising a head casting having a vertically disposed shank connected by the struts to the bars; a steering casting rotatably mounted on the shank; wheels journaled on the steering casting; and a hitch bracket on the steering casting extending in front of the wheels; said wheels being disposed closely adjacent and toed in at the ground level.

6. In a seeding machine as set forth in claim 3, a seed hopper on each side of the centerline of the frame, and straps around the hoppers connected with the distributors for holding the hoppers in the saddles.

7. In a seeding machine as set forth in claim 3, said furrow openers being carried by arms pivotally mounted on one frame bar; sleeve sections rotatably mounted on another frame bar; pressure arms carried by said sleeves above each of the furrow opener arms; connections between the pressure arms and furrow opener arms for yieldably depressing the latter as the former are depressed and for raising the latter as the former are raised; manually operable means for rotating the sleeves, and means for locking the sleeves in adjusted position.

8. In a seeding machine as set forth in claim 3, said drive shaft operating means comprising a vertical shaft in the forecarriage; means for rotating the shaft by and with the forecarriage wheel; a horizontal shaft above the vertical shaft; gearing connecting the horizontal shaft and drive shaft; change speed gearing connecting the vertical shaft and horizontal shaft; and a slip clutch in the horizontal shaft.

9. In a seeding machine, a frame; a combined steering and balancing wheeled forecarriage connected to the frame; a seed hopper mounted on the frame; furrow openers mounted on the frame; force feed distributors mounted opposite openings in the hopper; distributing pipes leading from the distributors and discharging seed behind the furrow openers; a drive shaft for operating each of the distributors; a vertical shaft in the forecarriage; means for rotating the shaft by and with the forecarriage wheels; a horizontal shaft above the vertical shaft; gearing connecting the horizontal shaft and drive shaft; and change speed gearing connecting the vertical shaft and horizontal shaft.

10. In a seeding machine as set forth in claim 9, the change speed gearing comprising a gear on the vertical shaft having a plurality of concentrically arranged rows of teeth on its face; a pinion splined on the horizontal shaft adapted to be moved into mesh with each of the concentric rows; said pinion having an annular flange thereon; and a member hingedly connected to the forecarriage provided with grooves adapted to receive the annular flange on the pinion to lock the pinion in mesh with the rows of concentric teeth.

11. In a seeding machine, a frame; a combined steering and balancing forecarriage; struts fixedly connecting the forecarriage with the frame; said forecarriage comprising a head casting having a vertically disposed shank connected by the struts to the frame; a steering casting rotatably mounted around the shank and having a bifurcated lower end; a wheel journaled in each bifurcation; a hitch bracket on the steering casting extending in front of the wheels; a seed hopper on the frame; furrow openers carried by the frame; distributors for feeding the seed from the hopper to the furrow openers; a drive shaft for operating the distributors, and means extending through the forecarriage for rotating the drive shaft.

12. In a seeding machine as set forth in claim 11, said drive shaft operating means comprising a vertical shaft journaled in the forecarriage; means for rotating the shaft by and with the forecarriage wheel; a horizontal shaft above the vertical shaft; gearing connecting the horizontal shaft and drive shaft; and change speed gearing connecting the vertical shaft and horizontal shaft.

BEN P. JOHNSON.